Nov. 10, 1953  F. MAHAN  2,658,653
BATTERY WATERING GUN
Filed June 6, 1949
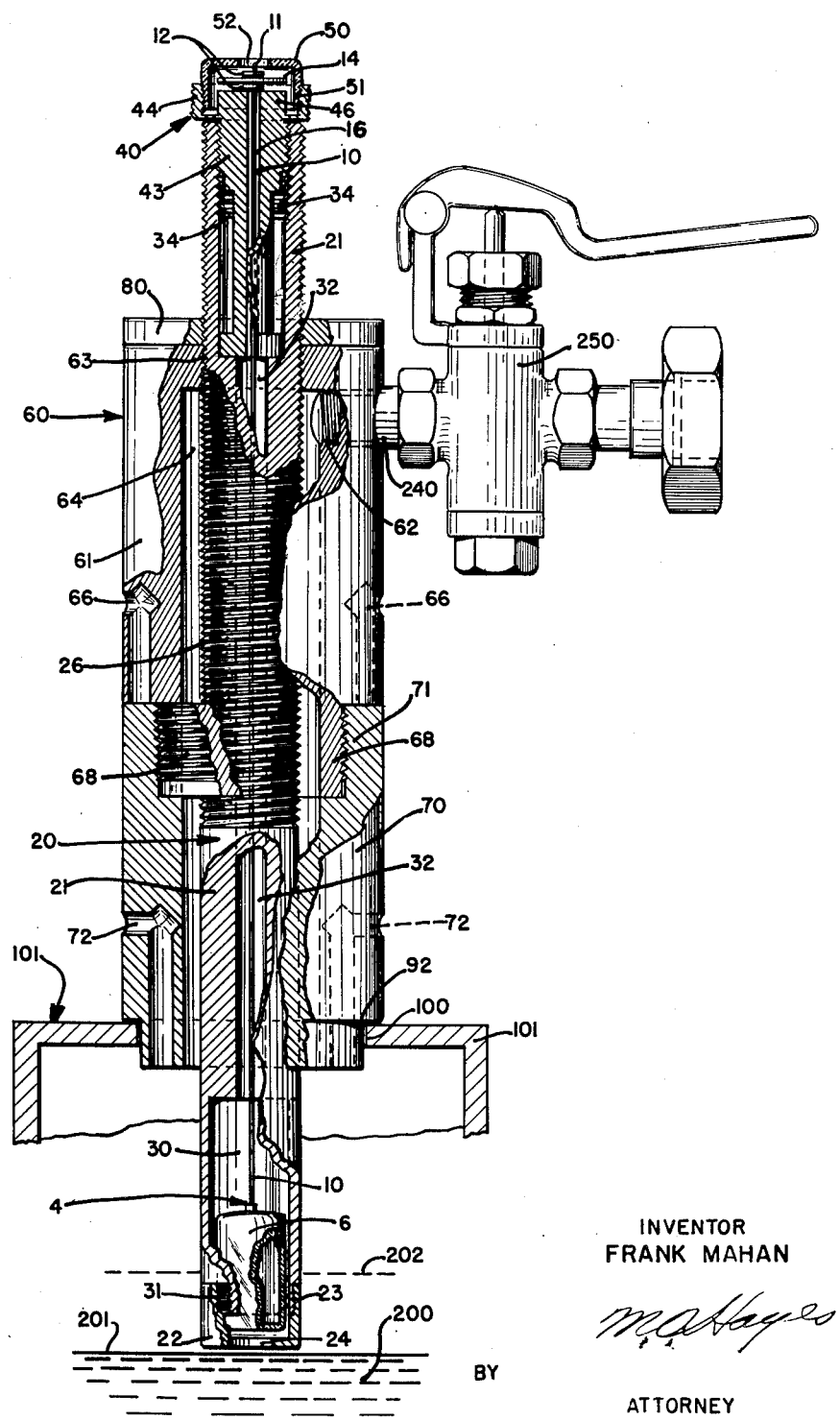
INVENTOR
FRANK MAHAN
BY *M. A. Hayes*
ATTORNEY Patented Nov. 10, 1953

2,658,653

UNITED STATES PATENT OFFICE 2,658,653

BATTERY WATERING GUN

Frank Mahan, Portsmouth, N. H.

Application June 6, 1949, Serial No. 97,491

3 Claims. (Cl. 226—19)

(Granted under Title 35, U. S. Code (1952), sec. 266)

This invention relates in general to devices for filling containers with liquids and, more specifically, to novel and efficient means for filling a container with liquid to a predetermined level.

Frequently, there arises a situation where a container has to be filled with liquid to a predetermined level therein. Storage batteries for example, very commonly present this problem. It is well known to those familiar with storage batteries, that electrolyte levels in a battery should be carefully maintained substantially fixed at a predetermined level. However, due to evaporation, the level of the electrolyte from time to time decreases from the correct level to some lower level, necessitating the addition of a quantity of water. Different types of batteries usually have different predetermined levels at which the electrolyte should be maintained.

A method previously used to accomplish the addition of water into the battery was essentially trial and error requiring a considerable number of checking operations. That is, small quantities of the total water necessary to fill the battery to its predetermined level were successively inserted therein, and the level after each addition checked with a level gauge. The numerous insertions of water and the equally numerous checking operations were time consuming and costly.

Accordingly the primary object of this invention is to provide a means for filling a container, as for example, that of a storage battery, with water to a predetermined level that simply requires one continuous addition of water and which provides a readily ascertainable indication when the filling requirement is complete.

Another and collateral object of the present invention is to provide means for effecting a substantial saving of time in container filling operations with a subsequent reduction of costs.

A further object of the present invention is to provide a means of novel design for filling differently formed containers to any predetermined level that is simple in operation and structure.

These and other objects of this invention will now become apparent from the following detailed specification taken in connection with the accompanying drawing which shows a partially broken and partially sectioned view of the preferred embodiment of the present invention positioned in the opening of a container to be filled with liquid to a predetermined level.

Referring to the drawing, the apparatus of this invention includes a float assembly 4 comprising a float 6; a rod 10 extending upwardly therefrom; and a marker 14 on the upper end 11 of rod 10. Float 6 is a hollow cylindrical body made preferably of plastic material. Rod 10, made preferably of a light weight metal such as aluminum, is threaded at its end 11 opposite the end which protrudes from float 6. The marker 14 is formed with a central opening and is mounted on the threaded end 11 of rod 10, and firmly held thereon between two nuts 12.

Float assembly 4 is centrally and axially enclosed, and movably suspended in a normal position within an inner tubular member 20. Member 20, made preferably of hard rubber or other non-metallic material, includes three distinct portions, namely, center portion 21, top portion 40 and base portion 22.

The main cylindrical portion 21 of inner member 20 has an internally threaded opening 34 at its upper end; a coaxial opening 32 smaller in diameter than opening 34 and extending downwardly therefrom; a coaxial opening 30 at its lower end extending from and larger in diameter than opening 32; and threaded male flange portion 31 at its lower end. Threads 26 are formed on the outer cylindrical surface thereof. Central opening 32 is of such size as to permit free axial movement of rod 10 within it, and central coaxial opening 30 is of such size as to permit free axial movement of the float 6 therein. Both openings 32 and 30 limit the amount of radial play of the float member 4 within the inner chamber 20.

The top cylindrical portion 40 of inner member 20 includes a threaded body portion 43 having a central, axial opening 16; a shoulder 46 at the upper end of opening 16; a threaded female flange portion 44; and a threaded transparent plastic cap 50. The threaded body portion 43 is fitted into the central threaded opening 34 with its central opening 16 coaxial with the opening 32 of center portion 21. The marker 14, having a larger diameter than that of opening 16, rests on the shoulder 46 of that opening, thereby suspending the float assembly 4 within the inner member 20. The threaded transparent cap 50 has an opening 52 and is fitted upon flange 44. The opening 52 is of smaller diameter than that of marker 14 but larger than the diameter of the rod 10, and therefore is adapted to restrict any upward movement therethrough excepting that portion of the float assembly 4 above the marker 14.

Cylindrical cap 22 of inner member 20 has an opening 24 therein, and is threaded on to the lower end of central portion 21 as illustrated.

Cap 22 thus protects the float 6 from any damaging contact with foreign objects outside the inner member 20, but provides a path for liquid to enter the opening 30; namely, through its opening 24, and consequently imparts an upward force to float 6.

The inner member 20 is supported in, and is axially adjustable with respect to, the outer body structure 60. The outer structure 60, preferably formed of hard rubber or other non-metallic material, consists of the main portion 61 and the adaptor 70 extending therefrom.

The main portion 61 of outer body structure 60 has a threaded central opening 63 at the upper end thereof; a larger coaxial opening 64 extending downwardly therefrom; a threaded opening 62 extending through a side wall thereof and entering the larger opening 64; a plurality of air vents 66; and a threaded portion 68 at its lower end. Inner member 20 is fitted into threaded opening 63 of the main portion 61, and is axially adjustable therein when a rotary movement is imparted to it relative to the outer body structure 60. A control valve 250 to which a hose may be connected and having a threaded outlet end 240, is fitted into the threaded opening 62 of the outer body structure 60. Liquid flowing through the valve 250 will therefore flow down through the space 64 surrounding inner member 20.

A cylindrical adaptor 70 is threaded to the lower end of outer body structure 60 and is adapted to fit snugly against the edge 100 of the opening of a container 101. The adaptor is formed with a central opening of the same size as that of opening 64 of outer body structure 60, and has a threaded female flange portion 71 for removable attachment to the threaded portion 68. A plurality of air vents 72 are formed in the lower end of the adaptor. A shoulder 92 at the lower end of the adaptor is adapted to fit snugly against a circular edge 100 of the opening of a container 101 to be filled with liquid. The air vents 72 are provided to maintain the pressure on the liquid 200 in the container 101 equal to the pressure outside the container. Any number of adaptors 70 may be made to adapt the outer body structure 60 for use with containers having openings of different sizes.

In some cases it may be desirable to use the apparatus without the adaptor 70. In such cases, the lower end of main portion 61, which also has air vents 66 formed therein, is inserted into the filling opening of the container.

The operation of the apparatus is very simple. As illustrated in the drawing, the apparatus is shown in position for operation. Preparatory to use, the inner member 20 is adjusted relative to outer body structure 60 so that when the assembly is positioned in the opening as illustrated, the lower end of the float 6 is at some pre-calculated distance below the pre-determined level to which the container is to be filled. This pre-calculated distance is the sum of the distance that the float 6 must be immersed in the liquid 200 to buoyantly support the float assembly, and the distance between marker 14 at its normal position and the position chosen to indicate when the container is filled to its pre-determined level. A lock nut 80, threaded onto inner member 20, is tightened against outer body structure 60 to maintain the adjusted relationship between the two members. Having the apparatus thus adjusted, it is positioned in the opening of the container 101, as illustrated, and the control valve 250 opened, thereby introducing liquid into the container 101. As the level 201 of the liquid 200 rises, the air displaced by the incoming liquid escapes through air vents 72. As the liquid rises to the predetermined level 202, it will impart an upward movement to the marker 14 through the rod 10 and the float 6. When the marker reaches the position chosen to indicate when sufficient liquid has been added, the operator closes the control valve 250, thereby stopping the flow of liquid into the container.

It can readily be seen that this invention is particularly adapted for use with all types of storage batteries. Although different types of storage batteries usually have different levels at which their electrolyte is to be maintained, the adjustability of inner member 20 relative to the outer body structure 60 renders the present apparatus adaptable for use in any storage battery.

This invention is also adaptable for use with many other types of containers, and modifications may be made to better suit its use in other fields.

It is apparent that many modifications of the present invention may be made by those skilled in the art. Thus, it is preferred that the scope of this invention be limited only by the appended claims.

The invention described herein may be manufactured and used by or for the Government of the United States of America for Government purposes without the payment of royalty thereon or therefor.

What is claimed is:

1. Apparatus for filling a container with liquid comprising an outer body portion having a central opening therein extending substantially the entire length thereof, the lower end of said body portion being adapted for insertion into an opening in said container, an inner member mounted coaxially within said body portion and being adapted to extend into said container, said inner member having threads throughout a portion of its length and being fitted into a threaded opening at that end of said outer body portion not inserted into said container thereby providing axial movement within said outer body portion when rotary movement is applied to it relative to said outer body portion, a liquid control valve having its outlet end extending into said central opening, a float suspended within said inner member for indicating when the level of the said liquid in the said container reaches a predetermined level, and vent holes formed in the wall of the said outer body portion and adapted to communicate the surrounding air with the inside of the container for maintaining the pressure on the liquid in said container equal to the pressure outside the container.

2. Apparatus for filling a container with liquid to a predetermined level comprising a hollow cylindrical body having a lateral intake passage and a longitudinal outlet passage, a control valve coupled to said intake passage for the introduction of liquid thereto, a tubular inner member having a threaded exterior, a threaded cap mounted on said body and adapted to hold said inner member coaxial with said outlet passage and extending therethrough into said container, a float actuated indicator mechanism supported by said inner member, and means for setting the amount of extension of said member and said mechanism to select the predetermined level at which the indicator is responsive.

3. Apparatus for filling a container with liquid to a predetermined level comprising a hollow cylindrical body having a lateral intake passage and a longitudinal outlet passage, a control valve coupled to said intake passage for the introduction of liquid thereto, a hollow adaptor arranged for fastening to the outlet passage of said body and having a shoulder proportioned to rest against the intake opening of said container, a tubular inner member having a threaded exterior, a threaded cap mounted on said body and adapted to hold said inner member coaxial with said outlet passage and extending through said body and said adaptor into said container, a float actuated indicator mechanism supported by said inner member, and means for adjusting the amount of extension of said inner member and said mechanism to select the predetermined level at which the indicator is responsive.

FRANK MAHAN.

References Cited in the file of this patent

UNITED STATES PATENTS

| Number | Name | Date |
|---|---|---|
| 77,809 | Flinn | May 12, 1868 |
| 328,827 | Ward | Oct. 20, 1885 |
| 1,054,912 | Engelhard | Mar. 4, 1913 |
| 1,316,167 | Lecrone | Sept. 16, 1919 |
| 1,562,971 | Kershaw et al. | Nov. 24, 1925 |
| 2,298,801 | Meyer | Oct. 13, 1942 |